3,488,269
LABILE HYDROGEN INITIATORS FOR VISIBLE LIGHT PHOTOPOLYMERIZATION
Robert J. Allen, Saugus, Mass., and Stanley Chaberek, Skaneateles, N.Y., assignors to Technical Operations, Incorporated, Burlington, Mass., a corporation of Delaware
Filed Sept. 15, 1965, Ser. No. 487,562
Int. Cl. C08f 1/16
U.S. Cl. 204—159.23          12 Claims

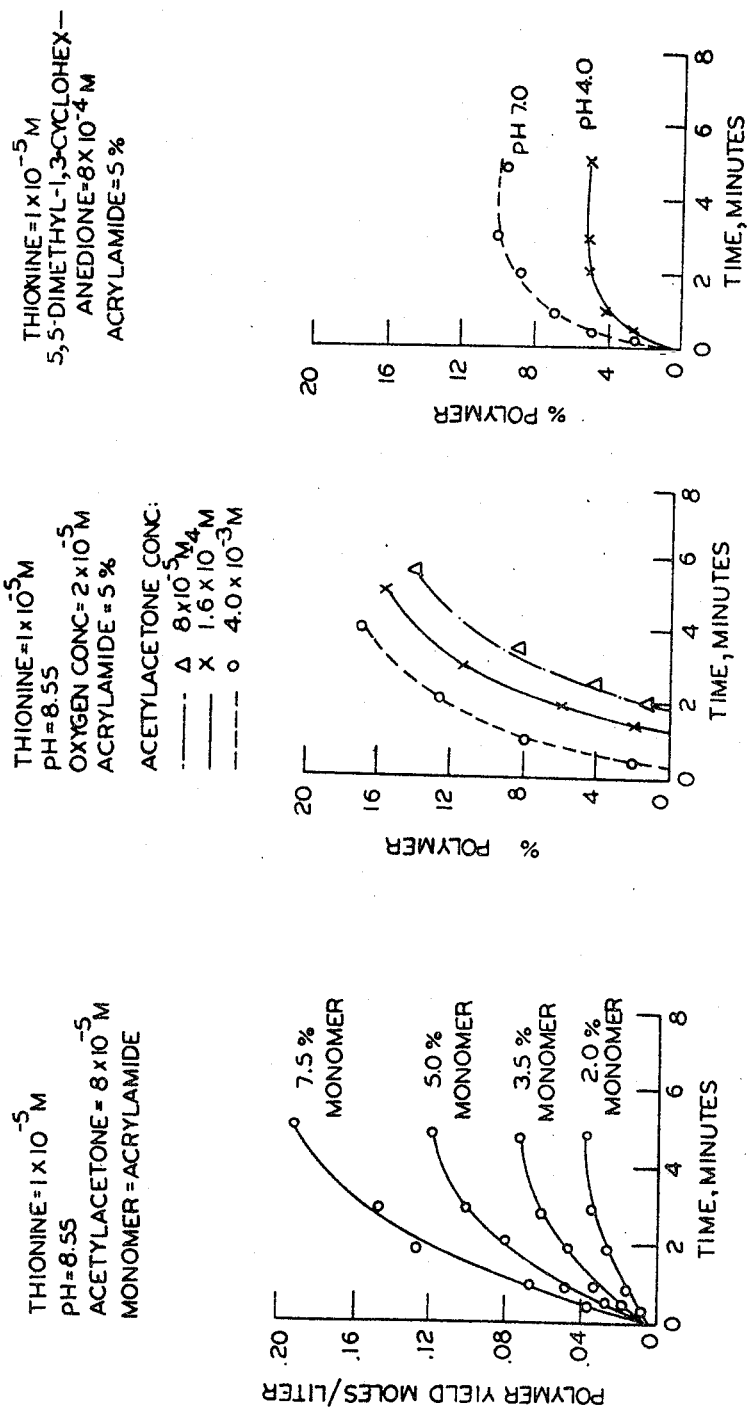

ABSTRACT OF THE DISCLOSURE

A visible light induced, dye-redox initiated polymerization of vinyl monomers is disclosed. The dye-redox initiator includes a reducible dye and an electron donor compound. The latter compound is characterized by having an active methylene or methine group containing a labile hydrogen atom, and is illustrated by such compounds as $\beta$-dicarbonyls, $\beta$-ketonitriles, and $\beta$-ketoimines.

---

The present invention relates to photopolymerization of unsaturated monomers which undergo polymerization via the formation of free radicals, and particularly to inducing such polymerization by initiator systems responsive to the visible light spectrum or portions of this spectrum.

It is known that polymerization of unsaturated monomers such as vinyl monomers, for example acrylamide, can be induced by visible light with an initiator system comprising a reducible dye and an electron donor, such as a secondary or tertiary amine, for example ethylene diamine tetra-acetic acid (EDTA). The dye and electron donor are selected so that they do not react with each other in the dark; but when excited with light of a wavelength with the energy absorption band of the dye, the photo energy absorbed by the dye converts the dye to a stronger oxidizing agent, which is capable of reacting with the electron donor component of the system to produce a free radical capable of initiating the monomer polymerization.

In general, this well known type of dye redox system of photopolymerization is considered applicable to the polymerizable vinyl compounds, particularly common examples of which are acrylamide, acrylonitrile, calcium acrylate, and the methacrylates, such as methyl methacrylate. Numerous types of light sensitizing dyes are reported as active in such a system, for example the xanthenes, acridines, thiazines, porphyrins and flavins. In addition to EDTA, mentioned above, other secondary and tertiary amines are generally suitable as electron donors of this redox initiating system.

In accordance with the present invention, it has been discovered that certain types of compounds are particularly effective in combination with sensitizing dyes for initiating free radical polymerization of vinyl monomers in response to irradiation with visible light. These types of compounds have not heretofore been recognzed as effective for this purpose. It has been found however, that these materials are not only effective, but in some instances the results indicate that they are even more effective and more efficient than any initiator compounds heretofore reported.

These initiator compounds discovered by the present invention may be characterized as having an active methylene or methine group containing a labile hydrogen atom that can undergo a redox reaction with the dye, thus reducing the dye and initiating polymerization when irradiated with light having within its spectrum a wavelength within the energy absorption band of the dye. It appears that the degree of effectiveness of this type of initiator compound is directly related to the degree of lability of the methylene or methine hydrogen. It has been found that the requisite characteristics are found in compounds which possess a grouping having more than one tautomeric form, and wherein in one such form the grouping can be represented by the generalized formula (A)(C)(M)(C)(B)

wherein (M) is an active methylene or methine group having a labile hydrogen atom, (A) and (B) are each an oxygen or a nitrogen atom or a group containing an oxygen or a nitrogen atom and may be the same or different, and said oxygen or nitrogen atoms are bound to their respective carbon atoms (C) by at least two valence bonds. It will be understood by those skilled in the art that functional vinylogs exist of compounds represented by the foregoing generalized formula, wherein one or more vinyl groups are located between (M) and (C). Accordingly, as used in the specification and claims, the foregoing generalized formula includes such equivalent compounds.

It has been found that like the vinyl monomer-dye-amine initiator systems of the prior art, in the vinyl monomer-dye-initiator systems of the present invention, visible light initiation of polymerization of the monomer can be effected either in the presence of oxygen or under anaerobic conditions. However, with amine initiator systems, as set forth in copending application of Robert L. Mac Niel et al., Ser. No. 314,432, filed Oct. 7, 1963, the presence of oxygen in the system causes a substantial induction period before initiation of any discernible polymerization, whereas under anaerobic conditions there is no discernible induction period. The same condition is found to exist when utilizing initiators of the present invention. Whereas the length of the induction period is dependent upon the concentration of oxygen present, it is considered that a concentration of about 0.005 p.p.m. or less of oxygen is optimum and certainly sufficiently low to describe the system as anaerobic. For the purposes of the present invention, greater concentrations of oxygen may certainly be tolerated, depending upon the significance of the induction period in the use to which the invention is put.

To generally illustrate the present invention and its improvement over the prior art, acrylamide monomer was anaerobically polymerized by thionine dye and acetylacetone as a labile hydrogen redox initiator, in the presence of an activating illumination of light containing the 5900 A. absorption band of the dye. For comparison purposes, polymerization was effected in the same system, with the same concentration of ingredients and parameters, except N,N-dihydroxyethylglycine and triethanol amine were each used as amine initiators in place of the acetylacetone. With starting concentrations of $2 \times 10^{-4}$ M for initiator, $10^{-5}$ M for dye, and 5% monomer, after 30 seconds of irradiation the polymer yield for the system containing the labile hydrogen initiator, acetylacetone, was 4.3%, while for the dihydroxyethylglycine and triethanol amine systems the yields were 2% and 1% respectively. Further, on additional studies utilizing varying concentrations of the initiators it was found that acetylacetone is approximately 10 times more active as an initiator than triethanolamine. Also, acetylacetone provides a much higher quantum efficiency than the amine initiators.

It is apparent that the increased quantum efficiency and polymer yield obtained from the present invention, as well as the discoverey of a new class of initiators in general, is a useful economic improvement in producing light induced polymerization. This improvement is useful for the general purposes of polymer production, and the increased quantum efficiency is particularly useful in applying photopolymerization to photographic or light induced recording.

It is accordingly one object of the present invention to provide novel initiators for visible light induced dye redox free radical type polymerization systems.

Another object of the present invention is to provide for the initiation of visible light induced dye redox free radical type polymerization by means of initiators having labile hydrogen atoms.

Still another object of the present invention is to provide for the initiation of visible light induced dye redox free radical type polymerization by means of initiators having active methylene or methine groups.

Other objects and advantages of the present invention will become apparent to those skilled in the art from a consideration of the following specific examples of the invention, had in connection with the accompanying drawings wherein:

FIGS. 1, 2, and 3 are graphs plotting polymer yield against time for several embodiments of the present invention.

Examples of illustrative specific compounds coming within the scope of the above-defined general formula which have been found effective in accordance with the present invention as photopolymerization initiators for vinyl monomer-dye systems are here set forth.

$\beta$-dicarbonyl compounds, such as: acetylacetone, disodium malonate, malonic ester, barbituric acid, 2-acetylcyclohexanone, acetoacetanilide, malonaldehyde, 5,5-dimethyl 1,3-cyclohexanedione, 3-methylacetylacetone, 3-chloroacetylacetone.

$\beta$-ketonitrile compounds, such as: ethylcyanoacetate, cyanoacetylcouarone, benzoylacetonitrile.

$\beta$-ketoimine compounds, such as: bis-acetylacetone ethylenediimine.

In addition, the metal chelates of the diketones have also been found to be operative as initiators for purposes of the present invention, including the cupric chelates of bis-acetylacetone ethylenediimine, acetylacetone, and 5,5-dimethyl-1,3-cyclohexanedione, and the acetylacetone chelates of titanium, aluminum, chromium, iron, manganese, nickel, and vanadium. It should be noted that some of the foregoing chelates are probably dissociated.

To more specifically illustrate the present invention, and as set forth in greater detail hereinafter, it has been found, for example, that each of the foregoing enumerated illustrative specific compounds and chelates initiates polymerization of calcium acrylate in the presence of thionine, when irradiated with a light containing the 5900 A. absorption band of thionine in its spectrum. Additionally, as further illustrative, it has been found that acetylacetone initiates photopolymerization of each of the following vinyl monomers: zinc acrylate, magnesium acrylate, acrylamide, methacrylamide, methylene-bis-acrylamide, acrolein, hydroxyethylmethacrylate, hydroxypropylmethacrylate, in the presence of thionine, when irradiated with light containing the 5900 A. wavelength. Also, to further exemplify the invention, bis-acetylacetone ethylenediimine, 5,5-dimethyl-1,3-cyclohexanedione has been found to be an effective photopolymerization initiator for the acrylamide-thionine system.

To further illustrate the present invention, a number of specific embodiments of the invention are presented, exemplifying its practice, parameters, and advantages. In these embodiments the photopolymerization was conducted in a glass vessel, in water solution, at room temperature, and buffered to the indicated pH, e.g., by a 0.1 M phosphate buffer for a pH of 8.55. The polymerization system was made up by adding the monomer and the initiator compound for the dye redox reaction to the buffered solution, then adding dye from a stock solution. After addition of the dye, anaerobic conditions of about 0.005 p.p.m. of oxygen were obtained by purging each solution with helium, requiring about two hours of rapid purge for 100 ml. of solution. The reaction vessel was then irradiated by a 300 watt stabilized projection lamp run at 80 volts. Samples of reaction solution were withdrawn periodically and the concentration of polymer determined. In instances where aerobic conditions were desired, desired oxygen concentrations were obtained by adding oxygen saturated water of known concentration to the anaerobic solutions just prior to irradiation. In each example all polymer samples showed an average molecular weight of about $5.5 \times 10^5$.

EXAMPLE 1

An anaerobic photopolymerization of acrylamide in the presence of thionine dye and acetylacetone as the labile hydrogen initiator was conducted in the following aqueous reaction mixture:

Acrylamide _____ percent __ 5
Thionine _____ M __ $10^{-5}$
Acetylacetone _____ M __ $4 \times 10^{-3}$
pH _____ 8.55

For comparison control purposes, an acrylamide-thionine photopolymerization was conducted in a substantially identical reaction mixture, except triethanolamine was used as an amine initiator in place of the acetylacetone labile hydrogen initiator. The results are set forth in Table I, and show the greatly superior results obtained with acetylacetone, particularly in the beginning of the polymerization reaction:

TABLE I

| | Percent Polymer | |
|---|---|---|
| | Triethanolamine | Acetylacetone |
| Time (sec.): | | |
| 15 | | 5.4 |
| 30 | 2.0 | 8.4 |
| 60 | 4.0 | 10.6 |

Further studies were conducted on the acrylamide-thionine-acetylacetone system to determine the effects of varition is plotted in FIG. 2 for three different acetylacetone concentration, and oxygen concentration. It was found that: the polymer yield for a given period of time increases with an increase in the initial monomer concentration, at least with monomer concentrations from 2.0% to 7.5%; when tested over pH levels of 7–9.5, the rate of polymerization increases with pH up to a maximum at about 8.5 to 9, and then decreases slightly; the rate of polymerization is independent of thionine concentration when tested over the fourfold range of $0.5-2 \times 10^{-5}$ M dye concentration; the presence of oxygen causes an induction period before polymerization begins, and increasing concentrations of acetylacetone reduce the period of induction. The effect of monomer starting concentration upon the rate of polymerization is plotted in FIG. 1 for four different monomer concentrations, and the effect of acetylacetone concentration on the induction period in an aerobic solution is plotted in FIG. 2 for three different acetylacetone initiator concentrations.

EXAMPLE 2

An anaerobic photopolymerization of acrylamide monomer in the presence of thionine dye and bis-acetylacetone ethylenediimine was conducted in the following reaction mixture:

Acrylamide _____ percent __ 5
Thionine _____ M __ $10^{-5}$
Bis-acetylacetone ethylenediimine ____ M __ $2 \times 10^{-4}$
pH _____ 8.55

The percent of polymer yields obtained from this example are set forth in Table III, and included in said table for comparison purposes are the percent polymer yields for photopolymerization utilizing the same monomer and dye at the same concentrations and at the same pH, but substituting equal concentrations for the bis-acetone ethylenediimine of acetylacetone and the amine initiators triethanolamine and N,N-dihydroxyethylglycine:

TABLE III

| Activator | Percent Polymer | | |
|---|---|---|---|
| | 30 seconds | 1 minute | 2 minutes |
| Bis-acetylacetone ethylenediimine | 3.0 | 5.4 | 9.2 |
| Triethanolamine | 1.3 | 2.5 | 4.0 |
| N,N-dihydroxyethylglycine | 2.2 | 4.3 | 8.4 |
| Acetylacetone | 4.3 | 8.4 | 12.7 |

EXAMPLE 3

5,5-dimethyl-1,3-cyclohexanedione was used as an activator for the photopolymerization of acrylamide monomer in the presence of thionine dye, at solution pH values of 4.0 and 7.0 in the following concentrations:

Acrylamide _____percent__ 5
Thionine _____M__ $10^{-5}$
5,5-dimethyl-1,3-cyclohexanedione _____M__ $8 \times 10^{-4}$ The percent polymer yield for each of these two embodiments is plotted against time in FIG. 3.

The quantum efficiencies of some of the foregoing examples have been computed and are set forth in Tables IV and V. Table IV shows the effect of activator concentration on efficiency for two activators, and Table V shows the effect of monomer concentration for one activator. The quantum efficiency is expressed as $1/\phi m$, representing the number of photons required to produce one polymer molecule. Molecular weight of polymer for all examples in Tables IV and V is $5.5 \times 10^{-5}$.

In Table IV, the photopolymerization systems contained $10^{-5}$ M thionine, 0.704 M acrylamide, and had a pH of 8.55.

TABLE IV

| | [1/φ m] | |
|---|---|---|
| Activator | Activator concentration, $8 \times 10^{-5}$ M | Activator concentration, $2.4 \times 10^{-4}$ |
| Acetylacetone | 6 | 4 |
| Bis-acetylacetone ethylenediimine | 15 | 8 |

In Table V, the photopolymerization systems contain $10^{-5}$ M thionine dye, and $8 \times 10^{-5}$ M acetylacetone initiator, at a pH of 8.55.

TABLE V

| Acrylamide monomer conc. | | |
|---|---|---|
| Moles/liter | Percent | 1/φm |
| 0.281 | 2.0 | 20 |
| 0.493 | 3.5 | 11 |
| 0.704 | 5.0 | 6 |
| 1.06 | 7.5 | 5 |

EXAMPLE 4

A number of metal chelates of acetylacetone were utilized as initiators in an acrylamide-thionine photopolymerization system having the following concentrations:

Acrylamide _____percent__ 5
Thionine _____M__ $10^{-5}$
Metal acetylacetonate _____M__ $10^{-4}$
pH _____ 8.6

The polymer yields obtained for various times of polymerization are set forth in Table VI:

TABLE VI

| | Percent Polymer | | | |
|---|---|---|---|---|
| | 30 seconds | 1 minute | 2 minutes | 3 minutes |
| Metal acetylacetonate: | | | | |
| Cu (II) | 2.4 | 5.9 | 11.8 | 13.4 |
| Ti (IV) | 3.8 | 7.3 | 10.9 | 12.7 |
| Al (III) | 4.8 | 8.1 | 12.5 | 14.8 |
| Cr (III) | 2.3 | 3.8 | 5.6 | 7.7 |
| Fe (III) | 4.9 | 8.4 | 13.5 | |
| Mn (III) | 4.4 | 7.9 | 13.0 | |
| Ni (II) | 4.4 | 7.2 | 14.1 | 16.4 |
| VO (II) | 4.0 | 7.6 | 11.8 | 14.6 |

EXAMPLE 5

The polymer yields obtained utilizing copper chelate of bis-acetylacetone ethylene-diimine initiator compound are set forth in Table VII. The photopolymerization system contained $10^{-5}$ M thionine, 5% acrylamide, and $8 \times 10^{-5}$ M copper chelate of the initiator compound, at a pH of 8.55.

TABLE VII

| Initiator (Cu chelate) | Percent Polymer | | | | |
|---|---|---|---|---|---|
| | 30 seconds | 1 minute | 2 minutes | 3 minutes | 5 minutes |
| Initiator Cu chelate of bis-acetylacetone ethylenediimine | 0.8 | 1.6 | 3.1 | 4.7 | 7.7 |

In an effort to understand the mechanism of the initiator of the present invention, certain studies were conducted with specific reference to acetylacetone as exemplary. Acetylacetone exists in equilibrium between two tautomeric forms, the keto and enol forms:

$$CH_3-\underset{\underset{O}{\|}}{C}-CH_2-\underset{\underset{O}{\|}}{C}-CH_3 \rightleftharpoons CH_3-\underset{\underset{O}{\|}}{C}-CH=\underset{\underset{OH}{|}}{C}-CH_3$$

and the enol form in turn is in equilibrium with the enolate ion:

$$CH_3-\underset{\underset{O}{\|}}{C}-CH=\underset{\underset{OH}{|}}{C}-CH_3 \rightleftharpoons CH_3-\underset{\underset{O}{\|}}{C}-CH=\underset{\underset{O^-}{|}}{C}-CH_3 + H^+$$

To ascertain whether the keto or enol form is active as the initiator, it was found that such compounds as biacetyl:

$$CH_3-\underset{\underset{O}{\|}}{C}-\underset{\underset{O}{\|}}{C}-CH_3$$

is inactive, and 2,5-hexanedione:

$$CH_3-\underset{\underset{O}{\|}}{C}-CH_2-CH_2-\underset{\underset{O}{\|}}{C}-CH_3$$

is only slightly active as photopolymerization initiators in systems hereinabove described. With these compounds, both the shortening and lengthening of the carbon chain between the carbonyl groups shifts the keto-enol equilibrium far toward the keto form. In addition, it was found that the activity of acetylacetone as a photopolymerization initiator in the present type of system is quite dependent on pH: at pH's below 7 the compound is essentially inactive as an initiator, and its activity increases markedly with pH between values of 7 and 9. The percent of enolate form for acetylacetone at pH's below 7 is essentially nil, while it increases rapidly with increasing pH above 7, thus shifting the overall equilibrium toward the enol-enolate form.

From this information it is proposed by way of suggested theory that the photopolymerization initiator mechanism embodied in the present invention is dependent upon the enol tautomer of the β-dicarbonyl compound, and upon the corresponding tautomers of the β-keto-nitriles and the β-keto-imines.

Thus, in accordance with the present invention, a new class of initiators for visible light induced photopolymerization has been discovered. In the foregoing specification a large number of different types of compounds has been presented, which are effective for this purpose, all being characterized by the presence of a labile hydrogen on an active methylene or methine group. It is understood that the invention is not limited to the particular compounds herein specifically disclosed, nor to the specific photopolymerization systems or procedures described. Many additional initiator compounds and variations in the photopolymerization systems and procedures will be apparent to those skilled in the art as a result of the disclosure contained herein; and such compounds, systems, and procedures as are embraced by the spirit and scope of the present invention are contemplated as within the purview of the present invention.

What is claimed is:

1. A visible light induced dye redox polymerization composition comprising a mixture of a monomer compound of the type which can undergo polymerization via the formation of free radicals, a reducible dye, and an electron donor compound, said dye and electron donor compound being selected to be substantially non-reactive in the dark but reactive in the presence of light of a wavelength within the energy absorption band of the dye to produce a free radical capable of initiating polymerization of said monomer compound, said electron donor compound having an active methylene or methine group containing a labile hydrogen atom, and being selected from compounds characterized as β-dicarbonyls, β-ketonitriles, or β-ketoimines, the composition having a pH of about 7 or greater and a substantial portion of said electron donor compound being in its ionic tautomeric form.

2. A composition as set forth in claim 1, wherein said electron donor compound is selected from the group of compounds consisting of: acetylacetone, disodium malonate, malonic ester, barbituric acid, 2-acetylcyclohexanone, acetoacetanilide, malonaldehyde, 5,5-dimethyl 1,3-cyclohexanedione, 3-methylacetylacetone, 3-chloroacylacetone, ethyl cyanoacetate, cyanoacetylcoumadone, benzoylacetonitrile, bis-acetylacetone ethylenediimine and chelates thereof.

3. A composition as set forth in claim 1, wherein said mixture is substantially anaerobic.

4. In a visible light induced dye redox polymerization system of the type comprising a monomer compound which can undergo polymerization via the formation of free radicals, a visible light responsive sensitizing dye, and an electron donor compound capable of undergoing a redox reaction with said dye when said dye is illuminated with light containing a wavelength within the energy absorption band of the dye; the improvement of said electron donor compound being a compound having an active methylene or methine group containing a labile hydrogen atom, and being selected from compounds characterized as β-dicarbonyls, β-ketonitriles, or β-ketoimines, the composition having a pH of about 7 or greater and a substantial portion of said electron donor compound being in its ionic tautomeric form.

5. A system as set forth in claim 4, wherein said electron donor compound is selected from the group of compounds consisting of: acetylecetone, disodium malonate, malonic ester, barbituric acid, 2-acetylcyclohexanone, acetoacetanilide, malonaldehyde, 5,5-dimethyl 1,3-cyclohexanedione, 3-methylacetylacetone, 3-chloroacylacetone, ethyl cyanoacetate, cyanoacetylcoumarone, benzoylacetonitrile, bis-acetylacetone ethylenediimine and chelates thereof.

6. In a system as set forth in claim 4, the system being substantially anaerobic.

7. The method of photopolymerizing a monomer compound of the type which can undergo polymerization via the formation of free radicals, comprising exposing to visible light a mixture of said monomer compound, a reducible dye, and an electron donor compound, wherein said light contains within its spectrum a wavelength within the energy absorption band of the dye, and wherein said dye and electron donor compound are selected to be substantially non-reactive in the absence of flight having a wavelength within said band but reactive in the presence thereof to produce free radicals for initiating the polymerization of said monomer compound, said electron donor compound having an active methylene or methine group containing a labile hydrogen atom, and being selected from compounds characterized as β-dicarbonyls, β-ketonitriles, or β-ketoimines, the composition having a pH of about 7 or greater and a substantial portion of said electron donor compound being in its ionic tautomeric form.

8. A method as set forth in claim 7, wherein said electron donor compound is selected from the group of compounds consisting of: acetylacetone, disodium malonate, malonic ester, barbituric acid, 2-acetylcyclohexanone, acetoacetanilide, malonaldehyde, 5,5-dimethyl 1,3-cyclohexanedione, 3-methylacetylacetone, 3-chloracylacetone, ethyl cyanoacetate, cyanoacetylcoumarone, benzoylacetonitrile, bis-acetylacetone ethylenediimine and chelates thereof.

9. A method as set forth in claim 7, wherein said mixture is substantially anaerobic.

10. A photopolymerization system, comprising an aqueous mixture of acrylamide, thionine, and a compound selected from the group consisting of: acetylacetone, bis-acetylacetone ethylenediimine, 5,5-dimethyl-1, 3-cyclohexanedione, the copper, titanium, aluminum, chromium, iron, manganese, nickel, and vanadium chelates of acetylacetone, and the copper chelate of bis-acetylacetone ethylenediimine, the mixture having a pH of about 7 or greater and a substantial portion of said compound being in its ionic tautomeric form.

11. A system as set forth in claim 10, wherein the mixture is substantially anaerobic.

12. In a visible light induced dye redox polymerization system of the type comprising a monomer compound which can undergo polymerization via the formation of free radicals, a visible light responsive sensitizing dye, and an electron donor compound capable of undergoing a redox reaction with said dye when said dye is illuminated with light containing a wavelength within the energy absorption band of the dye; the improvement of said electron donor compound being 5,5-dimethyl 1,3-cyclohexanedione, and the composition having a pH of about 4 or greater and a substantial portion of said electron donor compound being in its ionic tautomeric form.

References Cited

UNITED STATES PATENTS

| | | | |
|---|---|---|---|
| 2,875,047 | 2/1959 | Oster | 204—159.23 |
| 3,347,954 | 10/1967 | Bredereck et al. | 260—861 |

OTHER REFERENCES

D. Mavzerall, J. Am. Chem. Soc., 82, pp. 1832–33 (1960).

MURRAY TILLMAN, Primary Examiner

RICHARD B. TURER, Assistant Examiner

U.S. Cl. X.R.

96—115; 204—159.24